Figure 1:
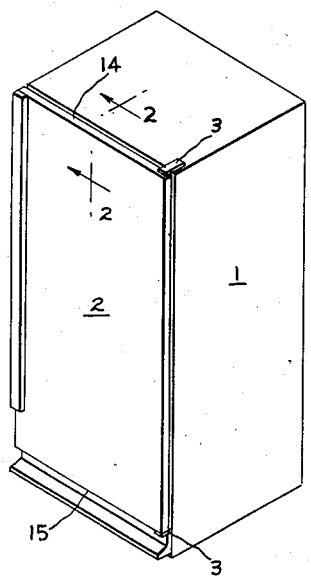

June 9, 1959

G. C. HARBISON 2,889,593

SEALING GASKET

Filed May 6, 1957

INVENTOR.
GEORGE C. HARBISON

BY

HIS ATTORNEY

United States Patent Office 2,889,593
Patented June 9, 1959

2,889,593

SEALING GASKET

George C. Harbison, Louisville, Ky., assignor to General Electric Company, a corporation of New York Application May 6, 1957, Serial No. 657,296

1 Claim. (Cl. 20—69)

The present invention relates to sealing gaskets and is more particularly concerned with gaskets for use in domestic refrigerators, food freezers, or the like.

In order to seal off the refrigerated space within the cabinet, domestic refrigerators include a compressible gasket which is compressed between the door and the cabinet so as to form a seal therebetween. To be effective, such gaskets must be resilient enough to correct for surface irregularities occurring at any point around the door opening, must resist permanent deformation or set, and, in order that a latch may be used which does not present a child safety hazard, the gasket should require only a low compressive force to form and maintain an effective seal.

A gasket meeting these requirements is disclosed in the copending application of Edward H. Roberts, Serial No. 512,221 filed May 31, 1955, now abandoned and assigned to the same assignee as the present invention. The present invention is an improvement over the invention of the application of Edward H. Roberts, which invention was made by said Edward H. Roberts prior to the present invention. Therefore, it is not intended to claim herein anything shown or described in said Roberts application, which is to be regarded as prior art with respect to this application.

The gasket of the Roberts application comprises a thin, flexible, substantially non-resilient outer sheath and a resilient compressible filler body disposed within the sheath and extending the length thereof. The filler body is composed of inorganic filamentary material, such as glass fibers, bonded together by means of a resinous binder. The filler body occupies at least a substantial portion of the space within the sheath and produces substantially all of the sealing pressure when the gasket is compressed; in the thin substantially non-self supporting outer sheath merely acting as a covering for the filler body and supplying little or none of the resiliency of the gasket.

In practice it has been found that a gasket of the type disclosed in the aforesaid Roberts application, because the outer sheath is non-self supporting, may under certain conditions and with certain types of doors tend to wrinkle and become uneven along the horizontal edges of the door adjacent the vertical hinge edge due to the fact that the face of the gasket tends to slide over or move in a direction parallel to the face of the cabinet during the final stages of door closing. This action is particularly noted in the pivoted type hinged door in which the pivot point for the door is within the door structure and spaced somewhat from the face of the cabinet. The non-self supporting sheath wrinkles when in sliding engagement with the face of the cabinet so that one or more recesses form transversely of the gasket upon closing of the door this providing openings through which ambient air may leak into the cabinet. In addition since the gasket presents a relatively wide pillow like surface for sealing engagement with the cabinet face, it has been found that the longitudinally extending center portion of the gasket is not always pushed uniformly against the face by the filler body within the gasket.

It is a general object of the present invention to overcome these difficulties by providing a gasket having a greater resistance to longitudinal deformation and of a construction such that the longitudinal center portion of the gasket is subjected to the greatest compressive force of the filler body.

Further objects and advantages of the present invention will become apparent as the following description proceeds and the features of novelty which characterize the invention will be pointed out with particularity in the claims annexed to and forming a part of this specification.

In carrying out the objects of the present invention there is provided a sealing gasket comprising a thin flexible non-resilient or non-self supporting tubular member or sheath and a resilient compressible filler body loosely disposed within the tubular cover member in such a manner that it produces substantially all of the sealing pressure of the gasket upon compression thereof. The gasket sheath or cover is characterized by a smooth relatively wide and flat sealing face portion adapted to engage the cooperating surface of the cabinet over a relatively wide area. In order to prevent wrinkling of the gasket during closing of the door and to assure a positive sealing pressure along the longitudinal center line of the gasket, a strengthening ridge is provided which extends longitudinally of the gasket face portion and on the inner side thereof throughout the entire length of the gasket or at least those portions of the gasket forming the seal along the door edges extending perpendicularly or normal to the hinge edge of the door.

Figure 2:
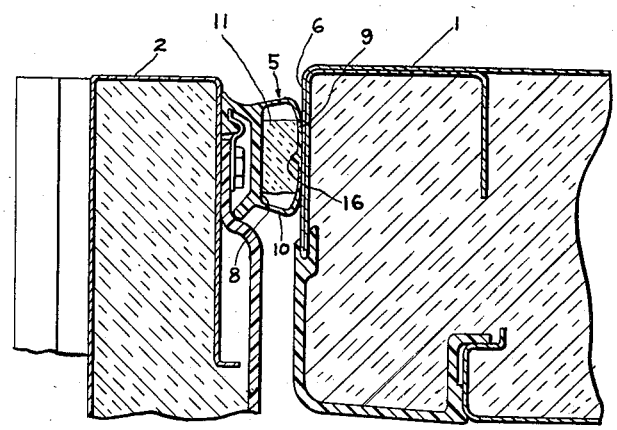

For a better understanding of the invention reference may be had to the accompanying drawing in which:

Fig. 1 is a perspective view of a domestic refrigerator incorporating the new and improved gasket; and Fig. 2 is a fragmentary sectional view along line 2—2 of Fig. 1.

Referring now to Fig. 1 of the drawing there is shown the form of a domestic refrigerator which includes a cabinet 1 and a door 2 hingedly mounted on the cabinet by means of a pair of hinges 3 positioned at the top and bottom of the door 2. As is shown more clearly in Fig. 2, a gasket 5 is provided along the edges of the door and in the illustrated modification this gasket is suitably mounted on the inner surface of the door 2. In this position it cooperates with the face portion 6 of the cabinet to seal the space between the door 2 and the cabinet face 6 when the door is in the closed position.

The gasket 5, preferably composed of a vinyl or polyethylene plastic comprises a relatively flat and wide base portion 8 and a relatively wide face portion 9 connected by side walls 10 to form a tubular member or cover. The face portion 9 and the side walls 10 are relatively thin and in themselves non-self supporting or in other words non-resilient. Threaded into the gasket sheath is a pad 11 of inorganic filamentary material, such as glass fibers bonded together by a resinous binder. As is described in the aforementioned Roberts application this preferred filler body consists of glass fibers of the diameter of the order of or less than about 0.00015 inch bonded together at their points of contact by a thermosetting resin. The resin content of the pad is such that the fibers are bonded together essentially only at their points of contact so that the resultant product is a resilient or springy mass. The preferred filler bodies are those in which the bonded pad of glass fiber is of a density ranging from about ½ to 1 and ½ pounds per cubic foot.

Preferably, as shown in Fig. 2 of the drawing the pad of filler body 11 is of substantially rectangular configuration or cross section and does not completely fill the space within the gasket sheath or cover. When the gasket is compressed the filler body or pad 11 supplies substantially all of the sealing pressure and the outer sheath or gasket cover merely provides a protective covering for the pad.

Because the outer sheath is relatively thin and non-resilient, the pad 11 is responsible for maintaining the desired shape of the gasket. However, the forces exerted by the pad are essentially only in a direction substantially perpendicular to the face portion 9 of the gasket.

In order to provide longitudinal stability to the face portion 9 of the gasket and therefore to prevent wrinkling of the gasket along the upper and lower edges of the door when the door is moved to a closed position about its pivot point represented by hinges 3 there is provided in accordance with the present invention a ridge 16 extending longitudinally along substantially the center line of the gasket face 9 and on the inner side thereof. In this position the ridge does not interfere with the uniform surface contact of the gasket over a relatively large area between the gasket and the face of the cabinet 6 and in addition it in effect compresses the pad 11 a greater degree along its line to provide positive sealing of the center portion of the gasket. Due to the longitudinal strengthening of the gasket face by the ridge 16, buckling or transverse wrinkling of the gasket face as a result of progressive frictional or sliding engagement of the gasket and the cabinet face at points along the upper and lowered edges adjacent the hinges 3 during closing of the door is prevented. At the same time the ridge 16 which extends only longitudinally of the gasket does not in any way affect the transverse flexibility of the face 9 nor does it in any way increase the force necessary to obtain the desired gasket seal.

While there has been shown and described a specific embodiment of this invention, it is to be understood that the invention is not limited to the particular construction shown and described and it is intended by the appended claim to cover all such modifications within the spirit and scope of the invention.

What I claim as new and desire to secure by Letters Patent of the United States is:

In combination, a cabinet having a face with an opening formed therein, a door pivotably mounted on said cabinet, said door being pivotable to a closed position covering said opening, and a gasket secured about said door so as to seal said opening when said door is in said covering position, said sealing gasket comprising a thin flexible non-resilient tubular member having a base portion secured to said door, a smooth relatively flat and wide sealing face portion facing toward said cabinet face, a strip of resilient compressible filler body composed of glass fibers extending longitudinally of and loosely disposed in said tubular member between said base portion and said face portion, said strip of filler material being of substantially rectangular cross section and having a width less than that required to fill said tubular member, said filler body providing substantially all of the sealing pressure of said gasket upon compression thereof, and a longitudinally extending ridge on the inner side of said face portion for longitudinal stiffening of said member and to provide maximum sealing pressure along the face portion of said gasket in the vicinity of said ridge.

References Cited in the file of this patent
UNITED STATES PATENTS

| | | |
|---|---|---|
| 1,942,509 | Davis et al. | Jan. 9, 1934 |
| 2,217,875 | Nauert | Oct. 15, 1940 |
| 2,331,340 | Mosher | Oct. 12, 1943 |
| 2,364,962 | Eagles | Dec. 12, 1954 |

FOREIGN PATENTS

| | | |
|---|---|---|
| 15,828 of 1899 | Great Britain | Sept. 30, 1899 |
| 503,016 | Canada | May 25, 1954 |